May 7, 1968 A. G. MIDDLER 3,381,935
BUTTERFLY VALVE

Filed Sept. 10, 1962 2 Sheets-Sheet 1

ALEXANDER G. MIDDLER
INVENTOR

BY John C. Faulkner
Ernest A. Beutler
ATTORNEYS

May 7, 1968     A. G. MIDDLER     3,381,935
BUTTERFLY VALVE

Filed Sept. 10, 1962     2 Sheets-Sheet 2

ALEXANDER G. MIDDLER
INVENTOR

BY John R. Faulkner
Ernest A. Beutler
ATTORNEYS

United States Patent Office 3,381,935
Patented May 7, 1968

3,381,935
BUTTERFLY VALVE
Alexander G. Middler, Detroit, Mich., assignor to Ford Motor Company, Dearborn, Mich., a corporation of Delaware
Filed Sept. 10, 1962, Ser. No. 222,541
3 Claims. (Cl. 251—305)

This invention relates to butterfly valves and more particularly to butterfly valves of the type adapted to control the flow of heated gases through the exhaust system of an internal combustion engine.

It is common practice to position a butterfly valve in the exhaust system of an internal combustion engine to direct a portion of the flow of heated exhaust gases around the intake manifold when the engine is cold. The heated intake manifold provides good vaporization of the fuel even though the engine temperature is low and insures smooth engine operation.

The butterfly valve, commonly known as an exhaust heat control valve, comprises a closure member supported at opposite sides of the exhaust conduit by aligned journals. The closure member is unbalanced, that is, it is eccentrically disposed relative to its pivot axis so that the pressure of exhaust gases tends to maintain the closure member in an opened position. A thermostatic spring holds the closure member shut until the engine reaches its normal operating temperature.

The exhaust heat control valve is a subject of frequent service complaints. The shaft which rotatably supports the closure member is continuously subjected to high temperature exhaust gases. The journals which rotatably support the shaft are generally formed in a valve housing that has considerably greater mass than the other portions of the exhaust system. The journals, therefore, heat more slowly than the shaft. The resulting thermal expansion of the shaft exceeds that of the journals and the shaft binds within its journals. The high temperature exhaust gases are also extremely corrosive and the attendant rusting of the shaft and journals can cause freezing of the closure member in either an opened or a closed position.

It is, therefore, the principal object of this invention to provide an improved butterfly valve in which a heat shield is provided for the closure member shaft and its journal.

The use of an unbalanced closure member further complicates the provision of an effective exhaust heat control valve. It is most desirable to provide a circular cross section exhaust conduit. If a flat closure member having a circular configuration of substantially the same size as the conduit is used, cutouts must be provided in the conduit to provide clearance for free movement of the unbalanced closure member. The cutouts must be formed adjacent to the shaft and supporting journals. These elements are thus further exposed to the heat and corrosion of the exhaust gases and freezing of the closure member shaft is aggravated.

To avoid the provision of cutouts for clearance in the exhaust conduit, it has been proposed to utilize a closure member having a noncircular cross section. A noncircular closure member is very undesirable inasmuch as the cost of the assembly is materially increased.

It is, therefore, a further object of this invention to provide an unbalanced closure member that is freely movable in a circular cross sectional conduit.

A butterfly valve embodying this invention comprises a housing having a gas flow passage. A journal formed in the housing rotatably supports a shaft that extends into the gas flow passage. A closure member is affixed to the shaft within the gas flow passage for movement from an opened to a closed position. A heat shield is provided for the portion of the shaft adjacent the journal and for the journal.

The pivot axis of the closure member may also be transversely and eccentrically disposed to the longitudinal axis of the gas flow passage. The projected image of the closure member, when in its closed position, is of the same shape and substantially the same size as the gas flow passage in a transverse plane of the latter. The closure member has a nonlinear cross section in a plane perpendicular to the transverse plane to provide clearance for free movement of the closure member into its opened position.

Further objects and advantages of this invention will become more apparent when considered in conjunction with the accompanying drawings, wherein.

Figure 1:
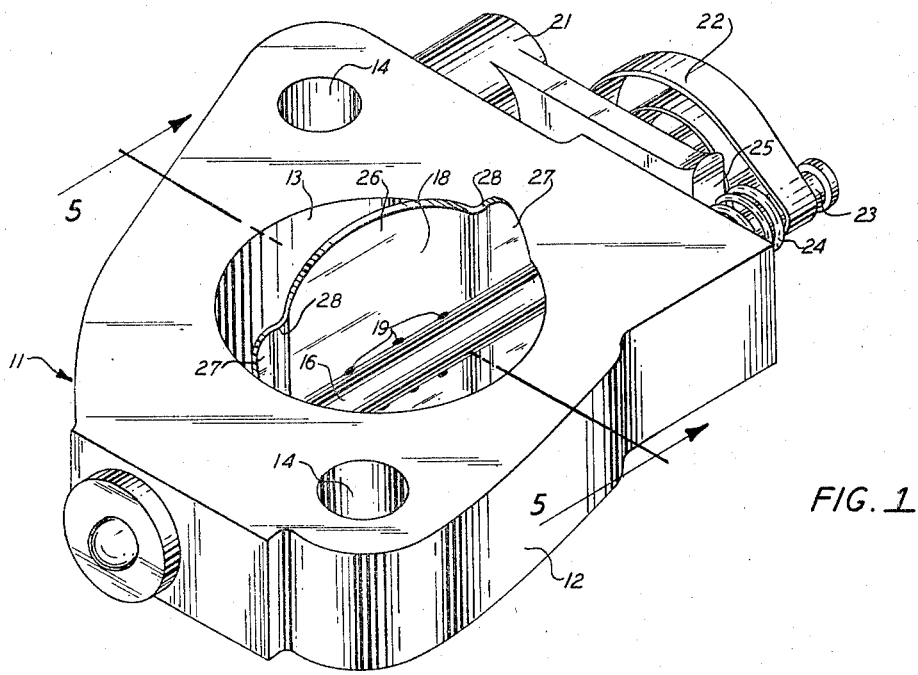
FIGURE 1 is a perspective view of an exhaust heat control valve embodying this invention showing the closure member in its wide open position.
Figure 2:
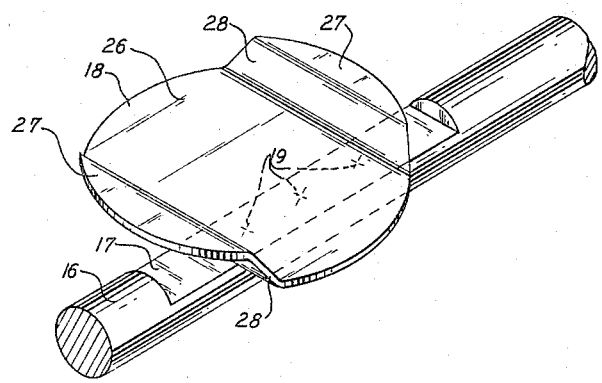
FIGURE 2 is a perspective view of the closure member of FIGURE 1 and its supporting shaft.

Referring now in detail to the drawings, an exhaust heat control valve assembly is indicated generally at 11. The valve assembly 11 comprises a cast iron housing 12 having a circular gas flow passage 13 formed therein. Bolt apertures 14 are provided in the housing 12 to permit the valve assembly 11 to be secured to the exhaust system of an internal combustion engine. Most frequently, the valve assembly 11 will be interposed between the exhaust manifold of the engine and the exhaust inlet pipe.

Aligned journals 15 are provided upon opposite sides of the passage 13 eccentric to the longitudinal axis of the passage 13. A shaft 16 is rotatably supported within the journals 15 and protrudes from both sides of the housing 12. The upper side of the shaft 16 is flattened as at 17, and has secured thereto a closure member 18. The closure member 18 is welded to the shaft 16, as at 19. The closure member 18 is eccentrically disposed relative to the pivot axis of the shaft 16. That is, the shaft 16 divides the closure member 18 into a long and a short side.

Figure 3:
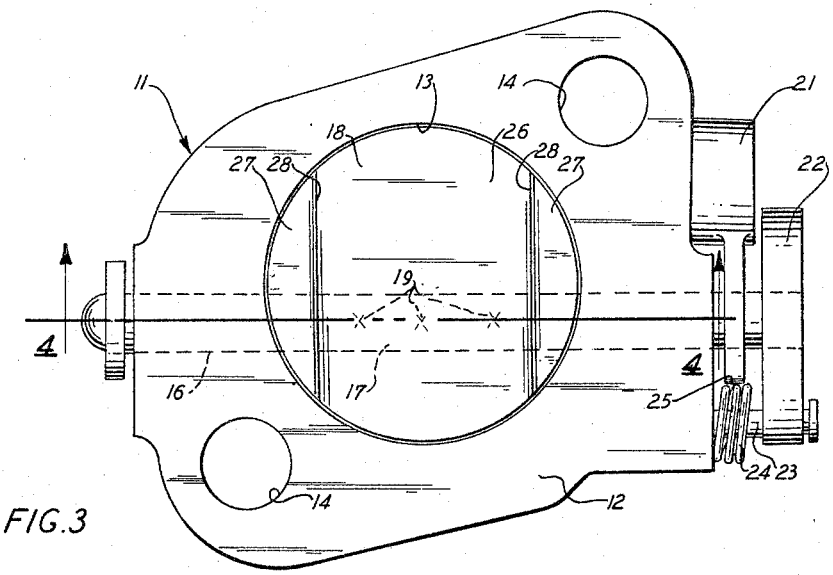
FIGURE 3 is a top plan view of the exhaust heat control valve showing the closure member in its closed position.
Figures 4, 5:
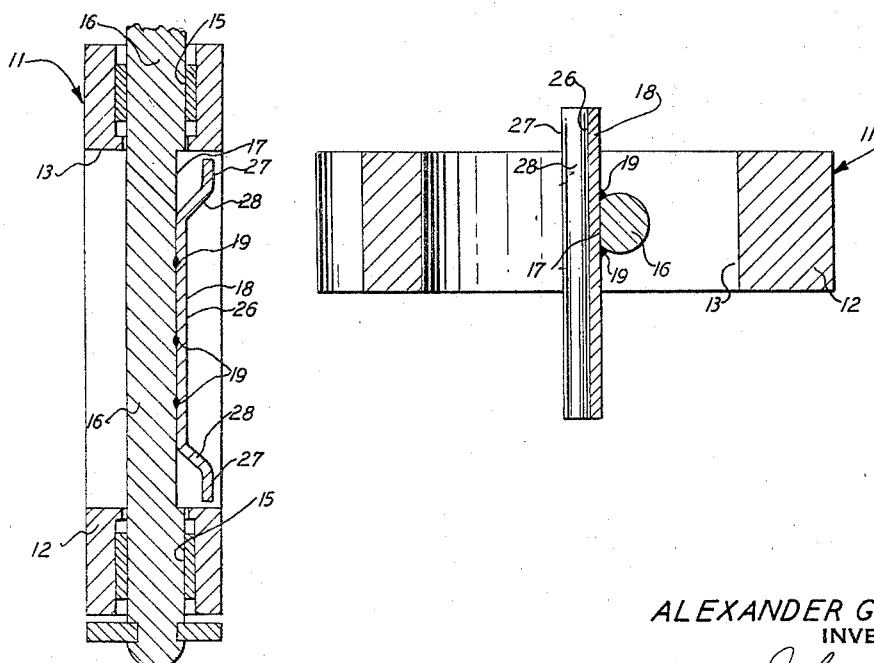
FIGURE 4 is a cross sectional view taken along line 4—4 of FIGURE 3.
FIGURE 5 is a cross sectional view taken along line 5—5 of FIGURE 1.

Affixed to one of the exposed ends of the shaft 16 is a counterweight 21 and one end of a thermostatic spring 22. The other end of the thermostatic spring 22 is connected to a pin 23 that is affixed to the housing 12. Under low ambient temperature conditions, the thermostatic spring 22 rotates the shaft 16 and closure member 18 into the closed position (FIGURE 3). When the engine reaches its normal operating temperature, the force of the counterweight 21 and the pressure of the exhaust gases upon the unbalanced closure member 18 overcomes the decreased tension in the thermostatic spring and the closure member 18 opens. When the closure member 18 opens its long side moves into the downstream side of the passage 13 (FIGURES 1 and 5).

A coil spring 24 encircles the pin 23 and is abutted by a stop 25 formed on one end of the counterweight 21 to absorb the rotational energy of the movable valve elements. The stop construction is described in more detail in my copending application entitled Butterfly Valve, Ser. No. 106,778, filed May 1, 1961, now Patent No. 3,166,294, and assigned to the assignee of this application.

As may be seen in FIGURE 3, the closure member 18 extends transversely to the longitudinal axis of the passage 13 when it is closed and has a plan view or projected image in a plane transverse to the longitudinal axis of the passage 13 of substantially the same size and shape as the passage 13. These shapes are circles of substantially the same diameter. If the closure member 18 was formed from a flat plate, the eccentricity of its pivot axis would preclude movement into the open position because of interference with the housing 12. The closure member 18 is, however, formed from a flat member deformed to have a wing-like cross sectional configuration in a plane parallel to the longitudinal axis of the passage 13 (FIGURE 4).

The closure member 18 comprises a central part 26 that is planar and is parallel to the pivot axis of the shaft 16. First and second end parts 27 are formed adjacent to the sides of the passage 13. The end parts 27 lie in a common plane that is parallel to the plane of the central part 26. The end parts 27 are, however, spaced from the shaft 16 toward the upstream side of the passage 13. That is, they are spaced between the shaft 16 and the high temperature source when the closure member 18 is in its closed position. The end parts 27, therefore, form a heat shield for the journals 15 and the portion of the shaft 16 adjacent to the journals 15. The end parts 27 are connected to the central part 26 by intermediate parts 28.

Because the end portions 27 are offset from the direction the long side of the closure member 18 moves as the closure member 18 pivots from the closed to the open position, clearance is provided to permit free movement of the closure member. This eliminates the necessities of forming cutouts in the passage 13 to permit free movement for the closure 18.

It is to be understood that the invention is not limited to the exact construction shown and described, but that various changes and modifications may be made within the scope of the invention as defined by the appended claims.

I claim:

1. A butterfly valve assembly comprising a gas flow passage, a closure member, and pivot means pivotally supporting said closure member within said gas flow passage for movement from an opened to a closed position, said closure member being on the upstream side of said pivot means when in its closed position, the pivot axis of said closure member being transversely and eccentrically disposed to the longitudinal axis of said gas flow passage and defining a long and a short side of said closure member, the projected image of said closure member when in its closed position being of the same shape and substantially the same size of said gas flow passage in a transverse plane of the latter whereby gas flow is substantially retarded, the edge portions of the closure member generally transverse to the pivotal axis being deflected farther away from the pivot means than the remainder of the closure member, the deflection of said edge portions being toward the diameter of said passage parallel to the pivot axis of the closure member when the closure member is in an open position.

2. A butterfly valve assembly comprising a cylindrical flow passage, a closure member, and pivot means supporting said closure member within said cylindrical passage for pivotal movement from an opened to a closed position, said closure member being on the upstream side of said pivot means when in its closed position, the pivotal axis of said closure member being offset from the longitudinal axis of said cylindrical passage and lying in a plane perpendicular to said longitudinal axis, the projected image of said closure member when in its closed position being a circle of substantially the same diameter as said cylindrical flow passage in a plane perpendicular to said longitudinal axis for substantially retarding fluid flow, the edge portions of the closure member generally transverse to the pivotal axis being deflected farther away from the pivot means than the remainder of the closure member, the deflection of said edge portions being toward the diameter of said passage parallel to the pivot axis of the closure member when the closure member is in an open position.

3. A butterfly valve assembly comprising a cylindrical flow passage, a closure member, and pivot means supporting said closure member within said flow passage for movement from a closed position wherein it extends transversely to the longitudinal axis of said flow passage to an open position wherein it extends parallel to said longitudinal axis, said closure member being on the upstream side of said pivot means when in its closed position, said flow passage and the projected image of said closure member when in its closed position being circles of substantially the same diameter in a plane normal to said longitudinal axis, the pivot axis of said closure member being offset from the longitudinal axis of said flow passage to define a long and a short side of said closure member whereby fluid pressure upon the upstream side of said closure member tends to rotate the long side of said closure member into the downstream side of said flow passage, the edge portions of the closure member generally transverse to the pivotal axis being deflected farther away from the pivot means than the remainder of the closure member, the deflection of said edge portions being toward the diameter of said passage parallel to the pivot axis of the closure member when the closure member is in an open position.

References Cited

UNITED STATES PATENTS

| | | | |
|---|---|---|---|
| 3,026,902 | 3/1962 | Ruhl | 137—484 X |
| 2,888,036 | 5/1959 | Reppert | 251—298 X |
| 2,766,768 | 10/1958 | Brown et al. | 236—101 X |
| 2,857,926 | 10/1958 | Rundquist | 251—305 X |
| 2,981,480 | 4/1961 | Else | 236—101 |

M. CARY NELSON, *Primary Examiner.*

A. ROSENTHAL, *Assistant Examiner.*